United States Patent [19]

Kito et al.

[11] Patent Number: 4,732,810

[45] Date of Patent: Mar. 22, 1988

[54] REVERSIBLE TEMPERATURE-INDICATING COMPOSITION

[75] Inventors: Tsutomu Kito, Gifu; Norikazu Nakasuji, Aichi; Takashi Kataoka, Aichi; Hiroshi Inagaki, Aichi; Yutaka Shibahashi, Aichi; Nobuaki Matsunami, Gifu, all of Japan

[73] Assignee: Pilot Ink Co., Ltd., Japan

[21] Appl. No.: 812,572

[22] Filed: Dec. 23, 1985

[51] Int. Cl.$^4$ .................. B01J 13/02; G01K 11/16
[52] U.S. Cl. ..................... 428/402.2; 106/21; 116/217; 252/962; 374/162; 503/208
[58] Field of Search ............. 428/402.2; 252/962; 374/162; 346/208; 106/21; 116/217; 503/208

[56] References Cited

U.S. PATENT DOCUMENTS

| | | | |
|---|---|---|---|
| 3,079,351 | 2/1963 | Staneslow et al. | 346/208 |
| 3,451,338 | 6/1969 | Baum | 252/962 X |
| 3,796,669 | 3/1974 | Kiritani et al. | 264/4.7 X |
| 4,028,118 | 6/1977 | Nakasuji et al. | 106/21 |
| 4,197,346 | 4/1980 | Stevens | 428/402.2 X |
| 4,301,054 | 11/1981 | Buirley et al. | 428/402.2 X |
| 4,601,588 | 7/1986 | Takahara et al. | 374/162 X |

FOREIGN PATENT DOCUMENTS 2158958  11/1985  United Kingdom ............ 428/402.2

Primary Examiner—Richard D. Lovering
Attorney, Agent, or Firm—Sughrue, Mion, Zinn, Macpeak, and Seas

[57] ABSTRACT

A new reversible temperature indicating composition for use in temperature indicating instruments is diclosed which is capable of accurate temperature indication in a variety of colors and characterized by a minimum range of hysteresis so that the marking drawn in this composition can decolor at or close the temperature at which its coloring takes place. In addition, the composition can provide a wide variety of hues and can be readily prepared. These and other advantages are provided by the inclusion as a main ingredient of an ester compound having $\Delta T$ value, defined $\Delta T$=melting point—clouding point, in the range under 3° C., the value that determines a desirably small range of hysteresis.

4 Claims, 3 Drawing Figures

REVERSIBLE TEMPERATURE-INDICATING COMPOSITION

BACKGROUND OF THE INVENTION

1. Field of the Invention

This invention relates in general to a reversible temperature-indicating composition, and in particular to such a composition composed as a main ingredient of one or more compounds selected from the ester group having a certain particular range of ΔT value (melting point—clouding point) and characterized by an extremely narrow hysteresis margin in the color density-temperature curve.

2. Description of the Prior Art

The conventional reversible temperature-indicating compositions include those materials utilizing the thermochromatic properties of metallic complex salts such as $Ag_2Hg_2I_4$ and $Cu_2HgI_4$. Another traditional example is cholesterol liquid crystal.

However, these materials have been found universally unacceptable in practical application because of the following problems.

(1) Metallic complex salts poses a rather very wide margin of hysteresis, that is, do not provide the decoloring effect in reversal at the precise temperature range that previously developes color. This hysteretically instable fluctuation have disqualified them for suitable application in temperature-indicating instruments such as thermometer.

(2) The metallic complex salts and cholesteric liquid crystal are very limited in selecting available chromatic varieties. In the industrial applications of metallic complex salts, only two versions of reversible color change are available, from yellow to orange and red to black. As for cholesterol liquid crystal, practical use is limited almost to color change reversibly brown to or from green and green to or from blue, due to an optical reaction.

(3) These conventional materials suffer a considerable limitation in processing, for example, liquid crystal display. A cholesterol liquid crystal reversible temperature indicating material requires the incorporation of a black substrate layer to insure proper coloring by optical reaction which adds extra manufacturing cost. Further, since it must be kept in completely sealed condition to protect against undesired effects of moisture and humidity, considerable limitations are imposed on only storage and transport but also practical application. Metallic complex salts possess a grave limitation on preparing the matrix through which the material is uniformly distributed.

SUMMARY OF THE INVENTION

The present invention has been proposed, therefore, to solve the above-mentioned conventional problems.

It is a primary objective of the present invention to provide a reversible temperature indicating material with a desirably narrow range of hysteresis (ΔH) enough to be suitable as a temperature indicating material for thermometers.

Another objective of this invention is to provide such a material which exhibits a wide range of chromatic varieties.

A further objective of the present invention is to provide such a material with minimum limitation on industrial preparation.

According to the present invention there is to provide a reversible temperature-indicating composition comprising:

(A) an electron-donating chromatic organic compound selected from the group consisting of diaryl phthalides, indolyl phthalides, polyaryl carbinols, leuco auramines, aryl auramines, acyl auramines, Rhodamine B lactams, indolines, spiropyrans, and fluorans;

(B) a compound selected from the group consisting of phenolic compounds having 6 to 49 carbon atoms, metal salts of the phenolic compounds, aromatic carboxylic acids having 7 to 12 carbon atoms, aliphatic carboxylic acids having 2 to 5 carbon atoms, metal salts of carboxylic acids having 2 to 22 carbon atoms, acidic phosphoric esters having 1 to 44 carbon atoms, metal salts of the acidic phosphoric esters and triazole compounds having 2 to 24 carbon atoms; and (C) an ester compound, said components (A), (B), and (C) being present in a weight ratio in the range of 1:0.1 to 50:1 to 800 and being in a form of homogeneous fused mixture, wherein said component (C) is selected from following compounds having ΔT value [melting point (° C.)—clouding point (° C.)] in the range of 3° C. or less: a branched alkyl ester and arylalkyl ester of straight-chain saturated aliphatic carboxylic acid and an alkyl ester of aliphatic carboxylic acid having double bond(s), branched alkyl group, hydroxyl group, carbonyl group or halogen atom in the carbon chain.

Figure 1:
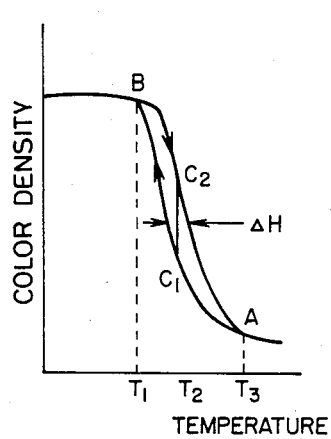
FIG. 1 graphically illustrates a relationship between change in a color density and temperature plotted to indicate the hysteresis characteristic of a thermosensitive temperature indicating material employing the reversible temperature indicating composition according to the present invention.
Figure 2:
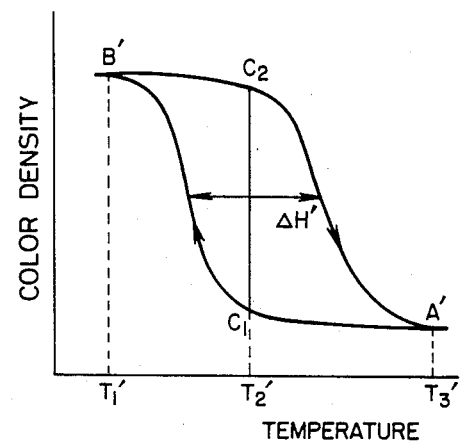
FIG. 2 graphically illustrates a similar relationship indicating the hysteresis characteristic of the prior known reversible temperature-indicating material.

In the graphs of FIGS. 1 and 2, temperature is taken on the axis of abscissa while the axis of ordinate is scaled for color density, in which the signs mean as follows:

$T_1$, $T_1'$: temperature level at which complete coloring takes place.

$T_2$, $T_2'$: transit range of temperature.

$T_3$, $T_3'$: temperature level at which complete decoloring takes place.

$C_1C_2$, $C_1'C_2'$: difference of color density at the same temperature level between coloring and decoloring processes.

ΔH, ΔH': hysteresis margin

Figure 3:
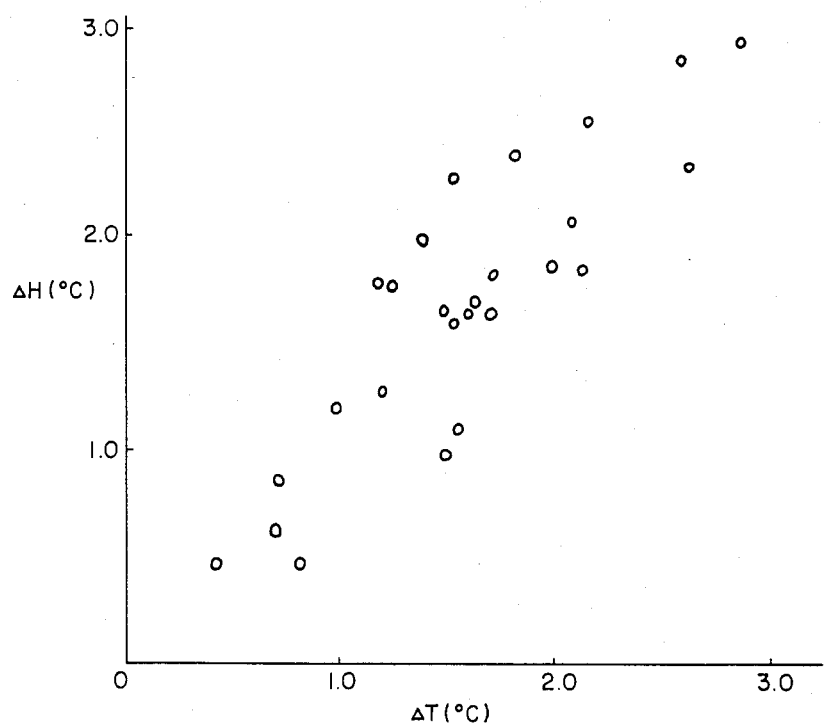

FIG. 3 is a scatter diagram plotted to illustrate the correlation of hysteresis margin ΔH (° C.), taken along the axis of ordinate, with different values of ΔT (° C.), taken along the axis of abscissa, of the ester compound in the reversible temperature indicating composition according to the present invention.

DETAILED DESCRIPTION OF THE INVENTION

These and other objectives are achieved by the addition of one or more compounds selected from the ester group having a certain particular range of ΔT value as main ingredient so that the resultant prepared compound provides a desired level of ΔH.

The inventors attribute the present invention to the hitherto entirely unknown discovery, as a result of extensive analytical research into the thermally coloring characteristic of reversible temperature indicating compositions, that the deviation of the point of decoloring from the coloring point of temperature or the hysteresis margin ($\Delta H$) has a close correlation with the $\Delta T$ value ($\Delta T$ = melting point − clouding point) of the ingredients contained in the composition selected from the ester groups.

The reversible temperature indicating composition in accordance with the present invention is a homogenous compatible material composed as required main ingredients (A) an organic coloring electron donative compound, (B) a compound selected from the group consisting of phenolic compounds, metal salts of the phenolic compounds, aromatic carboxylic acids, aliphatic carboxyl acids having 2 to 5 carbon atoms, metal salts of carboxylic acids, acidic phosphoric esters, metal salts of the acidic phosphoric esters, and 1,2,3-triazole compounds, and (C) one or more compounds selected from the ester group having $\Delta T$ value (melting point − clouding point) in the temperature range of 3° C. or less.

In the composition, ingredients (A), (B) and (C) are mixed into a desired ratio that is determined according to the kind of hue and the developing and decoloring temperature. The desired color, color density, and decoloring temperature of the reversible temperature indicating composition are variously obtained by selective combination of these components (A), (B) and (C), which have function for determining hue, color density and color/decoloring temperature respectively.

The present invention is specifically characterized by the inclusion of the aforesaid compounds as the main required ingredients, component (C). As the component (C), any ester compound may be applicable, provided that its $\Delta T$ value (defined as $\Delta T$, temperature in degree centrigrade = melting point − clouding point) is not greater than 3° C., more preferably 2.5° C., regardless of the molecular weight of the ester or whatever function group or substituent other than the ester radical or ester radical may be contained. The inclusion of one or more such ester compounds, it has been proved, can provide a desired variety of temperature indicating characteristic at the temperature range of approximately −80° C. to +100° C. in the reversible temperature indicating composition.

The gist of the present invention is based on the discovery that the $\Delta T$ value of the esters contained as compound (C) has a close relationship with the hysteresis margin ($\Delta H$) of the temperature indicating composition, and, in particular, that, when the $\Delta T$ value of the combination of these ester compounds is not higher than 3° C., the reversible temperature indicating composition has a desirably minimum hysteresis margin.

FIG. 3 illustrates graphically a relationship between the $\Delta T$ value of the ester compounds as component (C) and the $\Delta H$ range of the composition. Study on FIG. 3 obviously disclose a close correlation between $\Delta T$ value and $\Delta H$ margin. Further study tells that, when the ester compounds have a $\Delta T$ value of not greater than 3° C. as well, the resultant reversible temperature-indicating composition has a desirably minimum $\Delta H$ margin.

Thus, calculating the $\Delta T$ value of any given composition contained ester compounds can predict the $\Delta H$ range of the composition. This eliminates the conventional inconvenience in which computation of the $\Delta H$ range has to be done after the compositions are actually prepared.

These ester compounds listed above as having individually or in combination a desired $\Delta T$ value can be easily combined from extremely extensive varieties of acids and alcohols as materials, from which various kinds of ester compounds can be prepared including the one with low $\Delta T$ values. The present invention select from them those in the $\Delta T$ range of 3° C. or less for various practical purposes.

The ratio of each ingredient in the composition varies depending on the desired color density, the coloring temperature, the mode of color change, and the kinds of the contained compounds. However, our study has discovered that the composition can most likely provide a desired characteristic from the combination comprising 1 part of component (A), 0.1 to 50, and more preferably 0.5 to 20 parts of component (B), and 1 to 800 and more preferably 5 to 200 parts of component (C), all values by weight ratio.

Each of components (A), (B) and (C) can offer two or more kinds of compounds selected from each group to be properly mixed so as to prepare the composition of this invention. Two or more compounds can be mixed from each of the ingredients (A), (B) and (C), provided that the amount of each being within the specified range. The composition may also contain proper amounts of antioxidants, ultraviolet light absorbents, solubilizers, thinners, and/or intensifiers.

In addition, the composition of this invention permits to and an auxiliary agents such as alcohols, amides, ketones, and/or sulfides, if required, so long as they do not affect the hysteresis characteristic of the contained ester compounds (C). It is important to note, however, that these additives tend to expand the hysteresis range, if their total ratio by weight exceed 50% of the ester compounds. Accordingly, it is preferably to limit their inclusion below this limit.

As illustrated in FIG. 1, the reversible temperature indicating composition of the present invention shows a very narrow range of hysteresis to changes of temperature, taken along the axis of abscissa, repeating coloring and decoloring as temperature changes. Referring to the curve of FIG. 1, the sign A indicates the point of complete decoloration while the sing B the point of full coloring, at temperature $T_3$ and $T_1$, respectively. The signs $C_1$ and $C_2$ are respectively curve portions plotted to indicate their transient ranges of color density gradient in coloring and decoloring processed. $\Delta H$ is the hysteresis margin at midpoint in the transient ranges indicating how the color strength on the increase of temperature differs from that on the decrease at the same level of temperature $T_2$. It follows accordingly that the closer the curve portions $C_1$ and $C_2$, the narrower the hysteresis margin insuring the more precise temperature indication.

Further, it has been proved as a result of the experiments that the content of ester compounds as the compound (C) with the $\Delta T$ value of not greater than 3° C. enables the resulting reversible temperature indicating composition provide a desirably smaller $\Delta H$ margin of less than 3° C., insuring a mono-temperature mono-state condition satisfactory enough from the standpoint of visibility of reading. The still better conditions are provided if the $\Delta T$ value is not higher than 2.5° C.

FIG. 2 indicates the temperature-to-color density curve plotted to indicate the typical $\Delta H$ margin in the prior known reversible temperature indicating material.

It is obvious from the study on the Figure that the material is not applicable for accurate temperature indication since the color density thereof shows distinctively different two conditions at the temperature within a color changeable region. Those conventional materials normally contains organic compounds with the $\Delta T$ value ranging about 3° C. to about 8° C. as component (C) expanding the hysteresis margin $\Delta H$, which departing them from the desired accurate temperature indicating characteristic assured by a mono-temperature mono-state condition.

The components (A), (B) and (C) will be described in great detail.

The electron-donating chromatic organic compound (A) may be selected from the group of diaryl phthalides, polyaryl carbinols, leuco auramines, acyl auramines, aryl auramines, Rhodamine B lactams, indolines, spiropyrans, fluorans and the like.

The compounds classified in this group are exampled as follows:

Crystal violet lactone, malachite green lactone, Michler's hydrol, crystal violet carbinol, malachite green carbinol, N-(2,3-dichlorophenyl) leuco auramine, N-benzoyl auramine, Rhodamine B lactams, N-acetyl auramine, N-phenyl auramine, 2-(phenyl iminoethylidene)-3,3-dimethyl indoline, N-3,3-trimethlindolinobenzospiropyran, 8-methoxy-N-3,3-trimethylindolinobenzospiropyran, 3-diethylamino-6-methyl-7-chlorofluoran, 3-dimethylamino-7-methoxyfluoran, 3-diethylamino-6-benzyloxyfluoran, 1,2-benz-6-diethylfluoran, 3,6-di-p-toluidino-4,5-dimethylfluoran-phenylhydrazide-$\gamma$-lactam, 3-amino-5-methylfluoran, 2-methyl-3-amino-6,7-dimethylfluoran, 2,3-butylene-6-di-n-butylamino fluoran, 3-diethylamino-7-anilinofluoran, 3-diethylamino-7-(p-toluidino) fluoran, 7-acetoamino-3-diethylamino fluoran, 2-bromo-6-cyclohexylamino fluoran, and 2,7-dichloro-3-methyl-6-n-butylamino fluoran and the like.

The allowable compounds as the component (B) may be selected from the following groups (a) through (b).

(a) The group of phenolic hydroxides, both monophenolic and polyphenolic compounds, including the substituted phenols with alkyl, aryl, acyl and alkoxycarbonyl groups and halogen atom.

Following are the examples of these groups.

Tert-butylphenol, nonylphenol, dodecyl phenol, styrenated phenols, 2,2-methylene-bis(4-methyl-6-tert-butylphenol), $\alpha$-naphthol, $\beta$-naphthol, hydroquinon monomethylether, quaiacol, eugenol, p-chlorophenol, p-bromophenol, o-chlorophenol, o-bromophenol, o-phenyl phenol, p-(p-chlorophenyl)-phenol, o-(o-chlorophenyl)phenol, p-methyl hydroxybenzoate, p-ethyl hydroxybenzoate, p-propyl benzoate, p-butyl hydroxybenzoate, p-octyl hydroxybenzoate, p-dodecyl hydroxybenzoate, 3-iso-propyl catechol, p-tert-butyl catechol, 4,4-methylene diphenol, 4,4-thio-bis(6-tert-butyl-3-methylphenol), 1,1-bis(4-hydroxyphenyl)-cyclohexane, 4,4-butylydene-bis(6-tertbutyl-3-methylphenol), bisphenol A, bisphenol S, 1,2-dioxynaphthalene, chloro-catechol, bromocatechol, 2,4-dihydroxybenzophenon, phenol phthalein, o-cresol phthalein, methyl protocatechuate, ethyl protocatechuate, propyl protocatechuate, octyl protocatechuate, dodecyl protocatechuate, 2,4,6-trioxymethyl benzene, 2,3,4-trioxyethyl benzene, methly gallicate, ethyl gallicate, propyl gallicate, butyl gallicate, hexyl gallicate, octyl gallicate, dodecyl gallicate, cetyl gallicate, stearyl gallicate, 2,3,5-trioxynaphthalein, tannic acid, phenol resins and the like.

(b) The group of metal salts of the phenolic hydroxides, the metal being any selected from the group composed of sodium, potassium, lithium, calcium, zinc, zirconium, aluminium, magnesium, nickel, cobalt, tin, copper, iron, vanadium, titanium, lead, molybdenum and the like.

(c) The group of aromatic carboxylic acids and aliphatic carboxylic acids having 2 to 5 carbon atoms consisting of maleic acid, fumaric acid, benzoic acid, toluic acid, p-tert-butyl benzoate, chlorobenzoate, bromobenzoate, ethoxy benzoate, gallic acid, naphthoic acid, phthalic acid, naphthalein-dicarboxylic acid, acetic acid, propionic acid, butyric acid, valeric acid and the like.

(d) The group of metal salts of carboxylic acids, both monocarboxylic and polycarboxylic. Following are the examples of this group:

Acetic acid, propionic acid, butyric acid, caproic acid, caprylic acid, capric acid, lauric acid, myristic acid, palmitic acid, stearinic acid, isostearinic acid, behenic acid, crotonic acid, olenic acid, elaidinic acid, linoliec acid, linoleinic acid, monochloroacetic acid, monobromoacetic acid, monofluoroacetic acid, glycollic acid, hydroxy propionic acid, hydroxy butyric acid, ricinolic acid, 12-hydroxyl stearic acid, lactic acid, pyruvic acid, oxalic acid, malonic acid, succinic acid, adipic acid, sebacic acid, malic acid, tartaric acid, valeric acid, maleic acid, fumaric acid, naphthenic acid, benzoic acid, toluic acid, phenyl acetic acid, p-tert-butyl benzoic acid, cinnamic acid, chlorobenzoic acid, bromobenzoic acid, ethoxybenzoic acid, mandelic acid, protocatechuic acid, vanillinic acid, resorcinic acid, dioxybenzoic acid, dioxychlorobenzoic acid, gallic acid, naphthoic acid, hydroxy naphthoic acid, phthalic acid, monoethylester phthalate, naphthalein-dicarboxylic acid, monoethylester naphthalein dicarboxylic acid, trimellitic acid, and pyromellitic acid (as metal salts of carboxylic acids, the metal being any selected from the group of sodium, potassium, lithium, calcium, zinc, zirconium, aluminum, magnesium, nickel, cobalt, tin, copper, iron, vanadium, titanium, lead, molybdenum and the like).

(e) The group of alkyl esters, branched alkyl esters, alkenyl esters, alkynyl esters, cycloalkyl esters, and aryl esters of acidic phosphoric compounds and their derivatives. Both monoesters and diesters, or their combinations (acidic phosphates), are as exemplified below:

Methyl acid phosphate, ethyl acid phosphate, n-propyl acid phosphate, n-butyl acid phospate, 2-ethylhexyl acid phosphate, n-octyl acid phosphate, isodecyl acid phosphate, n-decyl acid phosphate, lauryl acid phosphate, myristyl acid phosphate, cetyl acid phosphate, stearyl acid phosphate, decocyl acid phosphate, oleyl acid phosphate, 2-chloroethyl acid phosphate, 2,3-dibromo-2,3-dichloro-propyl acid phosphate, dichloropropyl acid phosphate, cyclohexyl acid phosphate, phenyl acid phosphate, o-tolyl acid phosphate, 2,3-xylyl acid phosphate, p-cumenyl acid phosphate, mesityl acid phosphate, 1-naphtyl acid phosphate, 2-naphtyl acid phosphate, 1-anthryl acid phosphate, benzyl acid phosphate, phenethyl acid phosphate, styryl acid phosphate, cinnamyl acid phosphate, trityl acid phosphate, phenylmethyl phosphate, phenylethyl phosphate, phenyl n-propyl phosphate, phenyl n-butyl phosphate, phenyl n-octyl phosphate, phenyllauryl phosphate, phenylcyclohexyl phosphate, phenyl(2,3-xylyl) phosphate, cyclohexylstearyl phosphate, cyclohexylcetyl phosphate, dimethyl phosphate, diethyl phosphate, di-n-propyl phosphate, di-n-butyl phosphate, di-n-hexyl phosphate, di(2-ethylhexyl) phosphate, di-n-decyl phosphate, dilauryl phosphate, dimyristyl phosphate, dicetyl phosphate, distearyl phosphate, dibehenyl phosphate, diphenyl phosphate, dicyclohexyl phosphate, di-o-tryl phosphate, bis(triphenylmethyl) phosphate, bis(diphenylmethyl) phosphate, di(2,3-xylyl) phosphate, dibenzyl phosphate, di(1-naphtyl) phosphate and the like.

(f) The group of metal salts of the above group (e), the metal being any selected from the category of sodium, potassium, lithium, calcium, zinc, zirconium, aluminum, magnesium, nickel, cobalt, tin, copper, iron, vanadium, titanium, lead, molybdenum and the like.

(g) The triazole compounds that include 1,2,3triazole, 4(5)-hydroxy-1,2,3-triazole, 5(6)-methyl-1,2,3benzotriazole, 5-chloro-1,2,3-benzotriazole, 7-nitro-1,2,3-benzotriazole, 4-benzoylamino-1,2,3-benzotriazole, 4-hydroxy-1,2,3-benzotriazole, naphtho-1,2,3-triazole, 5,5'-bis(1,2,3-benzotriazole), 1,2,3-benzotriazole-4sulfooctyamide and the like.

The component (C) may be selected from the followings:

That group of the ester compounds having $\Delta T$ in the range under 3° C. that include a branched alkyl ester and arylalkyl ester of straight chain saturated aliphatic carboxylic acid and an alkyl ester of aliphatic carboxylic acid having double bond(s), branched alkyl group, hydroxyl group, carbonyl group, or halogen atom in the carbon chain. The examples of such ester compounds include:

2-ethylhexyl acetate, 2-ethylhexyl behenate, 2-ethylhexyl myristate, 2-ethylhexyl caprate, 3,5,5-trimethylhexyl laurate, 3,5,5-trimethylhexyl myristate, 3,5,5-trimethylhexyl palmitate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylbenzyl caproate, 2-methylbenzyl caprylate, 2-methylbenzyl caprate, 2-methylbenzyl laurate, 3-methylbutyl stearate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl stearate, 3-phenylpropyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, n-butyl erucate, 3,7-dimethyloctyl erucate, isostearyl erucate, stearyl isostearate, cetyl isostearate, 2-methylpentyl 12-hydroxystearate, 2-ethylhexyl 18-bromostearate, isostearyl 2-Keto myristate, 2-ethylhexyl 2-fluorostearate, stearyl oleinate, behenyl oleinate, stearyl linolate, behenyl linolate and the like.

In practical application, the reversible temperature indicating composition according to the present invention may be used in a pulverized or molten state. However, it may more efficiently be handled in a microcapsule. Capsulation can be done in any known method such as coacervation, interfacial polymerization, in situ polymerization, spray drying or the like.

The reversible temperature indicating composition according to this invention in the form of microcapsules can be applied in quite the same manner as in conventional practice in plastics, rubber materials or other surfaces or as printing ink, paint, pen ink or spraying material.

The composition and microcapsules contained thereof according to this invention will be described in concrete examples. It is to be understood, however, that the present invention should not be limited to the examples given.

In the examples, electron-donating chromatic organic compounds to be mixed into the composition are referred to in abbreviated form as CFs followed by a different number (e.g., CF-1, CF-2, and so on). Their respective identifications are listed together later in the specification, represented by chemical constitution.

In addition, determination of melting and clouding points, on both of which the $\Delta T$ value was calculated, was performed using melting point measuring apparatus as a type of automatically measuring variation of transmittance of a sample in terms of temperature.

The melting point was taken as the level of temperature at which the sample reached completely molten state. Every value in the obtained test data is the mean of 3 measured samples.

Further, determination of the $\Delta H$ was based on the difference of color densities (represented by $C_1$ and $C_2$ in FIG. 1) at the same temperature $T_2$, using a color-difference meter.

EXAMPLE 1

A mixture composes of 2 g of CF-1, 6 g of 2,2-bis(4-hydroxphenyl)pentane, and 50 g of 3,5,5-trimethylhexyl stearate was heated until it melted into a homogenous state and capsulated by known coacervation process into microcapsules containing the reversible temperature indicating composition of this invention. 50 g of the microcapsules thus produced was uniformly dispersed into a vehicle which comprises 80 g of water, 200 g of copolymerized ethylene-vinyl acetate emulsion (negatively charged, 4.5 to 5.5 in pH, 2,000 cps in viscosity at 30° C., and 50% in solid content) and 10 g of sodium alginate. With the resultant product, the 50 micron thick film of polyester was screen printed, and the printed area was laminated with a 12 micron thick polyester film to obtain a temperature indicating material. The printed film was then cooled to 2° C. until fully colored in magenta, and left to stand at a temperature of 8° C., a mid point in the transitive zone of coloring gradient (or the range between $T_1$ and $T_3$ in FIG. 1). A color density of the film showed $C_2$ under the above condition. Subsequently, the film was heated to 20° C., a completely fading temperature, followed by cooling and maintaining it at 8° C., wherein a color density showed $C_1$. Both were then measured for lightness in terms of value of color. $C_1$ was 7.2 while $C_2$ was 6.6. They looked to the eye just as suggested by their values.

The procedure was repeated with similar samples and their value of color determined. The results obtained were substantially same as above.

The $\Delta T$ value of the 3,5,5-trimethyhexyl stearate was 1.5° C.

The $\Delta H$ value of the reversible temperature indicating composition was 2.3° C.

EXAMPLE 2

A mixture of 5 g of CF-2, 12 g of paracumylphenol, and 100 g of 2-methylhexyl palmitate was heated until it melted into a homogenous state, and capsulated by known interfacial polymerization method into microcapsules containing the reversible temperature indicating composition. Then 80 g of the microcapsules thus produced was uniformly dispersed into a vertical consisting of 200 g of polymerized ester acrylate emulsion (negatively charged, 4 in pH, under 150 cps in viscosity, and 31% in solid content), 4 g of sodium alginate, and 0.5 g of cross-linking agent. With the resultant product, the cotton cloth was printed and then cooled at −20° C.

The $\Delta H$ value of the reversible temperature indicating composition 2.8° C.

In addition, following the preparation method of Example 1, the different versions of reversible temperature indicating composition were prepared and tested. The results, together with the measured values of $\Delta T$ and $\Delta H$, are presented in the Table.

TABLE

| Example No. | Reversible temperature indicating composition | | | $\Delta T$ value of component (C) | $\Delta H$ value of composition | Temperature (°C.) | |
| --- | --- | --- | --- | --- | --- | --- | --- |
| | Component (A) | Component (B) | Component (C) | | | Color at below coloring temperature | Color at above coloring temperature |
| 4 | CF-4 (6 g) | 5-nitro-1,2,3-benzotriazole (15 g) | 2-ethylhexyl caprate (100 g) | 2.0 | 3.0 | −30 Vermilion | Decolored |
| 5 | CF-5 (4 g) | p-octylphenol (20 g) | 1-ethylpropyl behenate (100 g) | 2.3 | 3.0 | 42 Pink | Decolored |
| 6 | CF-6 (2 g) | Bis(4-hydroxyphenyl) sulfon (5 g) | Stearyl erucate (100 g) | 1.9 | 2.5 | 38 Black | Decolored |
| 7 | CF-7 (6 g) | 2,3-xylylacid phosphate (15 g) | 3-phenyl propyl stearate (100 g) | 1.5 | 2.0 | 18 Dark red | Decolored |
| 8 | CF-8 (8 g) | 4-hydroxylstearyl bonzoate (16 g) | DL-2-methylbutyl stearate (100 g) | 2.4 | 3.8 | 15 Orange | Decolored | until the pattern colored to green. Then, the printed cloth was left to stand at a temperature of −12° C., a level in the transitive zone of coloring gradient, wherein a color density showed $C_2$. Then said cloth was exposed to a varying temperature from 20° C., the level at which the print was supposed to completely decolor, to −12° C. and maintained it at −12° C., wherein a color density showed $C_1$. Similarly, a lightness of both $C_1$ and $C_2$ were measured in terms of color value and gave 7.2 and 6.6, respectively, although they looked almost equally clear to the eyes. The procedure was repeated with similar samples and their color value measured. The results gave substantially the same readings as above.

The $\Delta T$ value of the 2-methylhexyl palmitate 1.4° C.

The $\Delta H$ value of the reversible temperature indicating composition 2.1° C.

EXAMPLE 3

A mixture consisting of 6 g of CF-3, 18 g of a zinc salt of bisphenol A, 40 g of 3-methylbutyl behenate, and 60 g of 2-methylbutyl behenate was heated until it melted into a homogenous state, and then capsulated by known spray drying method into microcapsules containing the reversible temperature indicating composition of this invention. Then, 80 g of the microcapsules thus produced was dispersed into a vehicle consisting of 20 g of copolymerized styrene-maleinic acid anhydride, 5 g of 25% aqueous ammonium solution, and 0.5 g of antifoaming agent to give an aqueous photogravure ink.

With the ink thus produced, the 20 micron thick synthetic paper of polystyrene was printed by photogravure method and then coated with a thin film of styrene resin over the printed surface to give a temperature indicating label. The resultant label was immersed into a vessel of water heated at 50° C. until the print got completely decolored, and then left immersed in a vessel of water heated at 38° C., a level in the transitive zone of coloring gradient wherein a color density showed $C_1$. Subsequently, the label was left to stand and cooled to at a room temperature once, followed by heating and maintaining at 38° C., wherein a color density showed $C_2$. Comparison gave almost no difference of color strength between two parts $C_1$ and $C_2$.

The $\Delta T$ value of the 3-methylbutyl behenate 1.4° C.

The $\Delta T$ value of 2-methylbutyl behenate 2.9° C.

The electron-donating chromatic organic compounds represented in code in the examples are as follows:

CF-1: 3-diethylamino-7,8-benzofluoran

CF-2: 6′-(diethylamino)-2′-[cyclohexyl(phenylmethyl)amino]-spiro[isobenzofuran-1(3H), 9′-(9H)xanthen]-3-one CF-3: 2′-[(4-n-butylphenyl)amino]-3′-methyl-6′-(diethylamino)-spiro[isobenzofuran-1(3H),9′-(9H)xanthen]-3-one CF-4: 3-diethylamino-5-methyl-7-dibenzyl-aminofluoran CF-5: 3,3′-bis(1-ethyl-2-methyl-1H-indol-3- )-1(3H)-isobenzofuranone CF-6: 6′-(cyclohexylmethylamino)-3′-methyl-2′-(phenylamino)-spiro]isobenzofuran-1(3H), 9-(9H)xanthen]-3-one CF-7: 2′-[bis(phenylmethyl)amino]-3′-methyl-6′-(diethylamino)-spiro]isobenzofuran-1(3H), 9′-(9H)xanthen]-3-one CF-8: 3-chlor-6-cyclohexylaminofluoran It will be clear from the above description that the present invention provides a improved reversible temperature indicating composition capable of coloring in a wide variety of hues at desired different levels of temperature. Particularly, the composition of this invention has an extremely marked advantage which has hitherto been unobtainable with conventional reversible temperature recording materials, that is can color at or very close the temperature it decolors. Further, it can perform with enhanced response to exhibit very close levels of color strength, whether on the increase or decrease of temperature. Further, with conventional compositions, the hysteresis range ($\Delta H$), a factor that determines the temperature indication performance, can only be computed on the finished product. However, the present invention permits pre-preparation estimation of this hysteresis value based on determination of the $\Delta T$ value, defined as melting point−clouding point=$\Delta T$, of the contained ester compounds, a main component for the composition, thus, the hysteresis range can be controlled depending on the purposes for which the prepared product is applied. This contributes to enhancing the efficiency of production. Further, there are numerous ester compounds with $\Delta T$ values in the effective range, combination can provide a variety of versions of the reversible temperature indicating composition with different response temperature.

Also, the composition according to this invention is capable of repeatedly marking and era ing at a fixed temperature. Thus, it can be embodied as a multia temperature indicator in which different versions of this composition are used to get colored in a different color at a different level of temperature. This invention may be applied in multi-color printing for printed patterns, drawn in two or more variations of the composition, capable of changing from one color to another with changes of temperature. Such a pattern can also be printed for fancy in T-shirts, ties, towels, gloves, training wears, blouses, skiing wears, for decoration or interesting effect in wall paper or pictures, or for temperature indication in packages or labels for contents subject to quality change by temperature. In addition, since the present invention features a very small value of hysteresis range ($\Delta H$), application as a multicolor temperature indicator can provide far greater enhanced performance, compared with those conventional reversible temperature indicating composition with coarse hysteresis values, particularly for detailed reading within small temperature ranges, measuring accurately with a wide variety of hues. It will be appreciated that the present invention can contribute as a thermometer and other possible applications contribute to increasing industrial usefulness and convenience.

While the invention has been described in detail and with reference to specific embodiment thereof, it will be apparent to one skilled in the art that various changes and modifications can be made therein without departing from the spirit and scope thereof.

What is claimed is:

1. A reversible temperature-indicating composition consisting essentially of:

(A) an electron-donating chromatic organic compound selected from the group consisting of diaryl phthalides, polyaryl carbinols, leuco auramines, acyl auramines, aryl auramines, Rhodamine B lactams, indolines, spiropyrans, and fluorans;

(B) a compound selected from the group consisting of phenolic compounds having 6 to 49 carbon atoms, metal salts of the phenolic compounds, aromatic carboxylic acids having 7 to 12 carbon atoms, aliphatic carboxylic acids having 2 to 5 carbon atoms, metal salts of carboxylic acids having 2 to 22 carbon atoms, acidic phosphoric esters having 1 to 44 carbon atoms, metal salts of the acidic phosphoric esters and triazole compounds having 2 to 24 carbon atoms; and (C) an ester compound, said components (A), (B), and (C) being present in a weight ratio in the range of 1:0.1 to 50:1 to 800, and being in a form of homogeneous fused mixture, wherein said component (C) is selected from following compounds having $\Delta T$ value [melting point (° C.)—clouding point (° C.)] in the range of 3° C. or less: a branched alkyl ester and arylalkyl ester of straight-chain saturated aliphatic carboxylic acid and an alkyl ester of aliphatic carboxylic acid having double bond(s), branched alkyl group, hydroxyl group, carbonyl group or halogen atom in the carbon chain.

2. A reversible temperature-indicating composition as claimed in claim 1, wherein the composition comprises the core of microcapsules having a diameter of 30 $\mu$m or less.

3. A reversible temperature-indicating composition as claimed in claim 1, wherein said ester compound is a branched alkyl ester of a straight-chain saturated aliphatic carboxylic acid.

4. A reversible temperature-indicating composition as claimed in claim 1, wherein said composition has been put in a pulverized state or is encapsulated.

* * * * *